(No Model.)

W. M. WHITE.
HAY WAGON.

No. 253,650.  Patented Feb. 14, 1882.

WITNESSES
F. M. Burnham.
H. C. Hustemann

INVENTOR
Wm. M. White
By Daniel Breed Attorney

N. PETERS, Photo-Lithographer, Washington, D. C.

UNITED STATES PATENT OFFICE.

WILLIAM M. WHITE, OF ELHI, WASHINGTON TERRITORY.

HAY-WAGON.

SPECIFICATION forming part of Letters Patent No. 253,650, dated February 14, 1882.

Application filed October 25, 1881. (No model.)

*To all whom it may concern:*

Be it known that I, WM. M. WHITE, a citizen of the United States of America, residing at Elhi, in the county of Pierce and Territory of Washington, have invented certain new and useful Improvements in Hay-Wagons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists of certain novel features in self-loading and self-discharging hay-wagons, which will be fully understood by the following description and claim.

Figure 1:
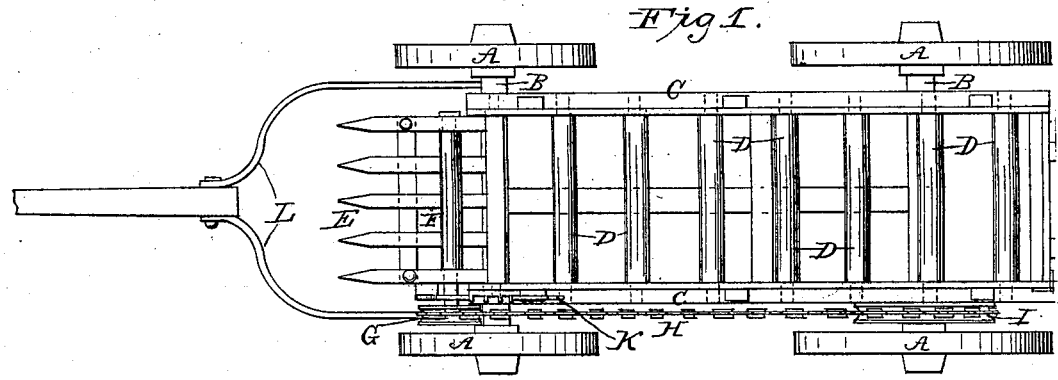
Figure 2:
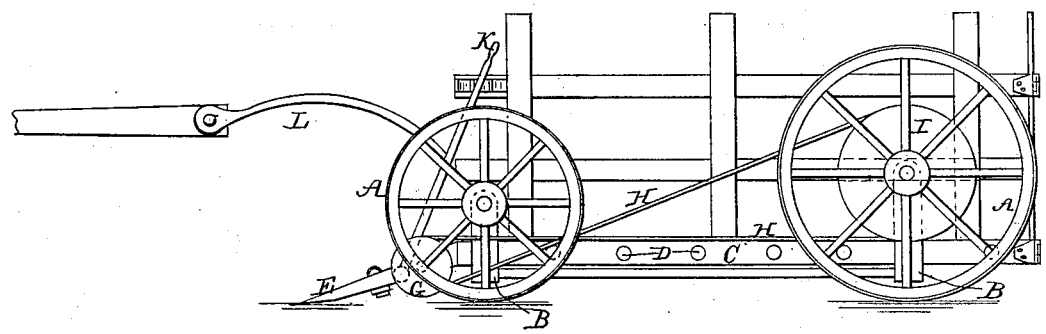

In the accompanying drawings, Figure 1 is a top view of my improved hay-wagon. Fig. 2 is a side elevation of the same.

My improved hay-wagon has four wheels, A, with bent axles B, which carry the bed-plate C of the frame very near the ground—say about six inches therefrom. This bed-plate has a series of rollers, D, which form the bottom of the hay-body or hay-rack. Hinged to the front of the frame is a rake, E, with the teeth or the points thereof riding on or near the ground, as seen in Fig. 2. The front roller, F, has a pulley, G, over which the chain or belt H passes, and motion is given to this belt and pulley by means of another pulley, I, on the rear wheel or axle of the wagon.

By means of the lever K the teeth of the rake may be raised and lowered at pleasure.

The pole of the wagon has curved hounds L, which raise the pole out of the way of the hay in loading the wagon.

By the above described construction of wagon with rake attached thereto the hay may be raked and loaded on the wagon with great ease. By simply driving the team over the field the hay is gathered onto the rake, while the rollers facilitate the automatic loading of the hay, especially at the commencement of the load. As the hay accumulates on the wagon a workman pitches the hay from the front, and thus builds up the load, first in the rear and finally in front. The rollers D serve the purpose of a self-discharging wagon.

By this construction of wagon the hay is easily unloaded by simply seizing the hay by means of an elevating-fork, or by a rope passing both under and over the load, the ends of the rope being secured behind, when the wagon may be drawn from under the hay, which thus easily travels backward on the rollers.

Having thus described my invention, what I claim is—

In a self-loading hay-wagon, the combination of the bent axle B, carrying the body or bed of the wagon close to the ground, the series of rollers D D, the rake E, roller F, pulley G, belt or chain H, and pulley I, substantially as and for the purposes set forth.

In testimony whereof I affix my signature in presence of two witnesses.

WM. M. WHITE.

Witnesses:
DANIEL BREED,
GEO. F. GRAHAM.